United States Patent
Saze et al.

(10) Patent No.: US 7,250,876 B2
(45) Date of Patent: Jul. 31, 2007

(54) DEVICE AND SYSTEM FOR TOLL PAYMENT

(75) Inventors: Hiroki Saze, Kariya (JP); Norihiro Isobe, Tokai (JP)

(73) Assignee: DENSO Corporation, Kariya (JP)

( * ) Notice: Subject to any disclaimer, the term of this patent is extended or adjusted under 35 U.S.C. 154(b) by 248 days.

(21) Appl. No.: 11/023,580

(22) Filed: Dec. 29, 2004

(65) Prior Publication Data

US 2005/0168351 A1    Aug. 4, 2005

(30) Foreign Application Priority Data

Jan. 26, 2004    (JP)    ............................. 2004-017428

(51) Int. Cl.
*G08G 1/00*    (2006.01)
(52) U.S. Cl. ........................................ 340/928; 705/13
(58) Field of Classification Search .................... None
See application file for complete search history.

(56) References Cited

U.S. PATENT DOCUMENTS 6,396,418 B2    5/2002    Naito

| | | |
|---|---|---|
| 2001/0025251 A1* | 9/2001 | Konishi et al. ................ 705/13 |
| 2002/0049630 A1* | 4/2002 | Furuta et al. .................. 705/13 |
| 2002/0067291 A1* | 6/2002 | Ikeda ........................... 340/928 |
| 2003/0110075 A1* | 6/2003 | Shioda et al. ................. 705/13 |
| 2004/0212518 A1* | 10/2004 | Tajima et al. ............... 340/928 |
| 2005/0086100 A1* | 4/2005 | Yanagisawa et al. ......... 705/13 |

FOREIGN PATENT DOCUMENTS

| JP | 403154818 A * | 7/1991 |
| JP | A-7-21424 | 1/1995 |
| JP | A-2001-338316 | 12/2001 |
| JP | A-2003-317125 | 11/2003 |

* cited by examiner

*Primary Examiner*—Benjamin C. Lee
(74) *Attorney, Agent, or Firm*—Posz Law Group, PLC (57) ABSTRACT

A navigation device stores road data that includes positions of toll roads where payback of a part of a toll is provided based on a used distance of each of the toll roads. The navigation device computes a traveled distance of the relevant toll road to thereby compute the used distance of the toll road based on the computed traveled distance. Thus, the used distance of a toll road can be accurately computed, even when a vehicle travels a loop line within the toll road by multiple circles. Information that relates to the payback and includes the used distance of the toll road is then transmitted to a center to thereby receive a partial payback of the toll.

17 Claims, 7 Drawing Sheets

METROPOLITAN EXPRESSWAY (TOLL: ¥700)

| USED DISTANCE x(km) | PAYBACK |
|---|---|
| a > x | ¥300 |
| b > x > a | ¥200 |
| c > x > b | ¥100 |

DEVICE AND SYSTEM FOR TOLL PAYMENT

CROSS REFERENCE TO RELATED APPLICATIONS

This application is based on and incorporates herein by reference Japanese Patent Application No. 2004-017428 filed on Jan. 26, 2004.

FIELD OF THE INVENTION

The present invention relates to a device or system for toll payment.

BACKGROUND OF THE INVENTION

There is conventionally proposed a variable toll collection system that a toll for a toll road is computed according to an average traveling speed during traveling the toll road (refer to Patent Document 1). In this system, a traveling start time or a traveling end time is detected by a road-vehicle communications between an in-vehicle unit and an entrance toll booth or an exit toll booth when a vehicle passes through the entrance toll booth or the exit toll booth, respectively. A necessary time period or a toll-road use time period for traveling the toll road is thereby computed based on the traveling start time and the traveling end time. Further, a traveled distance on the toll road is obtained based on a distance from the entrance toll booth to the exit toll booth. Then, based on the traveled distance and the necessary time period, an average traveling speed is computed. It is thereby designed that as the average traveling speed decreases, a toll to be paid decreases.

Patent Document 1: JP-2001-338316 A

As described above, by using a road-vehicle communications, a vehicle automatically pays a toll when the vehicle passes through a toll booth on a toll road without stopping. This system is in practical use as the Electronic Toll Collection System (ETC). With respect to a vehicle having an ETC in-vehicle unit associated with the ETC, it is investigated that a toll be partially paid back based on a used distance in some metropolitan toll roads such as the Metropolitan Expressway and the Hanshin Expressway adopting a constant-amount toll. That is, with respect to a vehicle having an ETC in-vehicle unit that pays a constant toll at an entrance toll booth or gate, the toll is partially paid back based on a toll-road used distance.

In this used-distance payment system, a used distance needs confirming, so that it is studied that communications devices (exit ETC devices) are installed at exits of the toll roads for confirming a traveled distance.

However, installation of an exit ETC device needs additional costs; further, for instance, in the Metropolitan Expressway that includes a loop line, only confirming the traveled distance at the exit does not accurately confirm, for instance, the used distance of a vehicle that circles the loop line in more than one cycle.

To solve this, another communications device may be installed at a branching point of the loop line for confirming that a vehicle passes through the branching point. However, this communications device is needed for each of the branching points, so that installing of a roadside infrastructure needs much more cost than installing only exit ETC devices.

SUMMARY OF THE INVENTION

It is an object of the present invention to provide a device or a system for toll payment in which a used distance on a toll road is accurately confirmed even without installing a communications device at a toll road exit for confirming the used distance.

To achieve the above object, a toll payment device is provided with the following. The device is provided in a vehicle for paying, at an electronic toll collection gate that the vehicle passes when using a toll road, a toll for the toll road where a partial payback of the paid toll is able to be received based on a used distance of the toll road. An in-vehicle unit is included for automatically paying a toll by communications with a roadside unit disposed at the electronic toll collection gate. A road data storing unit is included for storing road data including position information of the toll road. A position detector is included for detecting a current position of the vehicle. A used-distance information generating unit is included for generating used-distance information relating to a used distance of the toll road that the vehicle uses, based on the detected current position and the stored road data. Further, a transmitting unit is included for transmitting the generated used-distance information.

In this structure, road data includes positions of toll roads in which a toll can be partially paid back according to a used distance. Information relating to the used distance can be thereby generated based on the road data and a current position of a subject vehicle. The generated information is then used for confirming the used distance even without installing a communications device such as an exit ETC device.

In another aspect of the present invention, a toll payment system is provided with the following. Namely, the system includes the above-described device and a center that interfaces the above-described roadside unit. The center executes via the roadside unit a process relating to a payback when used-distance information is received, in addition to a process relating to a toll payment.

In this structure, a user can receive a partial payback, with respect to a toll paid, for instance, through an ETC in-vehicle unit.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

A toll payment device and a toll payment system according to embodiments of the present invention will be explained with reference to drawings. This toll payment system is directed to the Electronic Toll Collection system (ETC) being currently in practical use for decreasing congestion at toll booths on toll roads such as expressways, enhancing usability by adopting a cashless method, or the like.

(First Embodiment)

Figure 1:
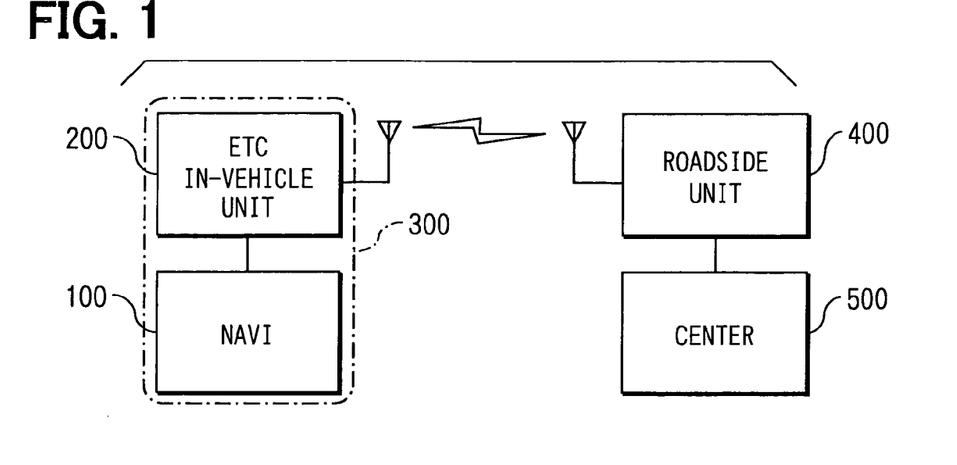
FIG. 1 is a block diagram showing an overall structure of a toll payment system according to embodiments of the present invention.

A toll payment system of a first embodiment includes a toll payment device constituted by a navigation device 100 and an ETC in-vehicle unit 200, a roadside unit 400 that is installed at an ETC gate communicating with the ETC in-vehicle unit 200 via a road-vehicle communications, and a center 500 that interfaces with the roadside unit 400.

The ETC in-vehicle unit 200 is, as known, for automatically paying a toll using bi-directional communications with the roadside unit installed at the ETC gate on a toll road. The ETC in-vehicle unit 200 accepts an ETC card being a credit card (not shown) inserted into it to thereby capable of pay the toll. This ETC card includes a user ID that is uniquely assigned to each user. When a subject vehicle passes through an ETC gate, the user ID is sent to the roadside unit 400 to thereby cause a user who pays the toll to be identified.

The ETC in-vehicle unit 200 includes the following functions. First, a communications management function manages wireless communications with the roadside unit 400 and data communications with the ETC card. Second, information management function stores and manages vehicle information, history information of payment data for tolls, or the like. Third, an ETC card processing function reads and writes information such as the user ID or the like necessary for paying the toll by data communications with the ETC card.

The roadside unit 400 is a wireless communications unit installed at the ETC gate on the toll road to receive or transmit information necessary for payment for tolls on toll roads by communicating with the ETC in-vehicle unit 200 mounted in a vehicle. The center 500 interfaces with the roadside unit 400 for processing, using the ETC card inserted to the ETC in-vehicle unit 200, payment or payback of tolls of toll roads from or to a bank account, respectively.

Figure 2:
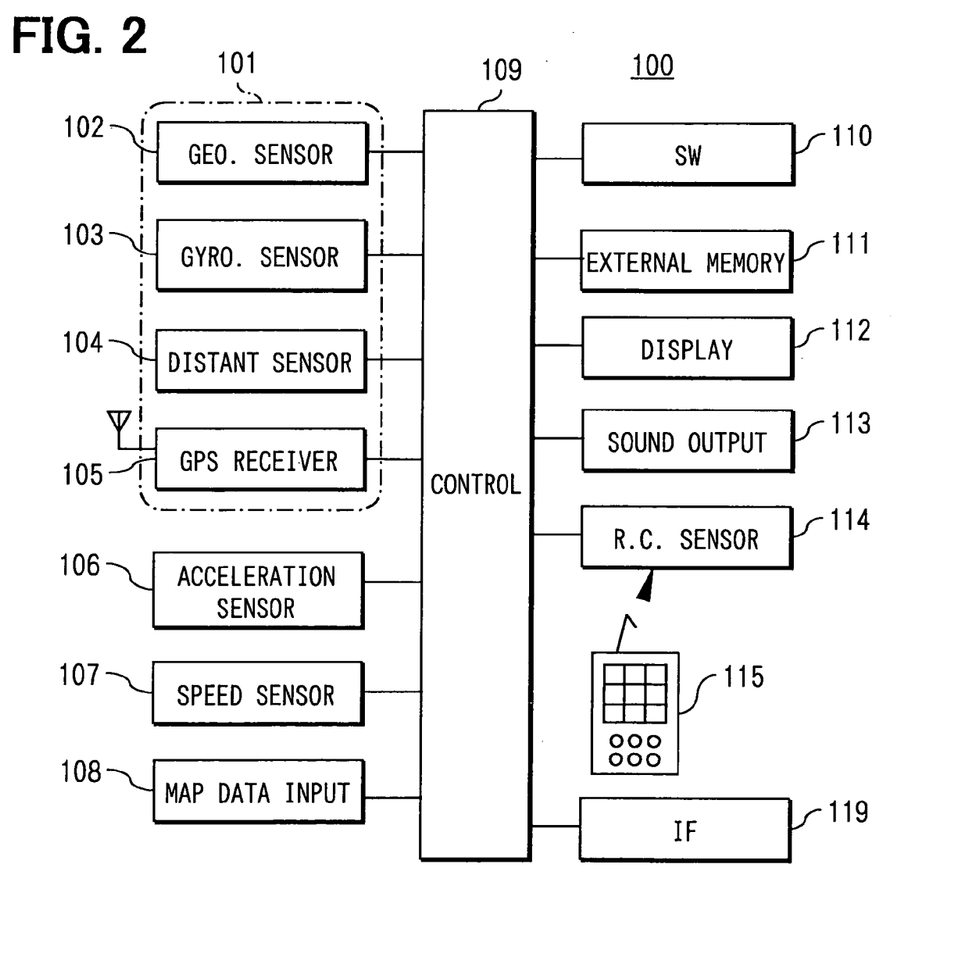
FIG. 2 is a block diagram showing an overall structure of a navigation device according to the embodiments.

The navigation device 100 constitutes the toll payment device 300. The navigation device 100 includes a position detector 101, an acceleration sensor 106, a vehicle speed sensor 107, a map data input unit 108, a manipulation switch group 110, an external memory 111, a display device 112, a sound output device 113, a remote control sensor 114, an interface 119, and a control circuit 109 interfacing the foregoing components. Here, the navigation device 100 interfaces with the ETC in-vehicle unit 200 via the interface 119 to be thereby capable of communicating data with the ETC in-vehicle unit 200.

The control circuit 109 is constructed of a usual computer and contains a CPU, a ROM, a RAM, an input and output, and a bus line interfacing the foregoing components. The ROM stores a program that the control circuit 109 executes. According to the program, the CPU or the like executes a given computation process. Here, the program can be also externally obtained via the external memory 111.

The position detector 101 includes a geomagnetism sensor 102 for detecting an advancing direction of a subject vehicle; a gyroscope sensor 103 for detecting an angular speed while the subject vehicle is rolling, pitching, or yawing; a distance sensor 104, a GPS (Global Positioning System) receiver 105 for detecting a current position of the subject vehicle based on radio waves from the satellites. These sensors or the like have respectively different characteristic errors, so that multiple sensors are used while being mutually compensated.

Further, the position detector 101 can be constituted by a part of the above sensors or the like depending on an accuracy of each sensor. Further, a rotation sensor for a steering (not shown) or a vehicle speed sensor 107 that detects a speed from a rotation speed of each following wheel can be also used.

The acceleration sensor 106 detects accelerations generated in the subject vehicle in a forward-rearward direction, a leftward-rightward direction, or an upward-downward direction. The vehicle speed sensor 107 detects a speed of the subject vehicle.

The map data input unit 108 is for inputting map data including road data, background data, landmark data, and toll data for toll roads. These data are stored in a rewritable storage medium such as a memory card, a hard disk drive, in addition to a read-only storage medium such as a CD-ROM, or a DVD-ROM. Now, link data and node data included in the road data constituting the map data will be explained below.

First, a link is defined as one of divisional portions into which each road on a map is divided by multiple nodes, each of which is such as an intersecting, branching, or converging point. Therefore, connecting multiple links results in constituting a road. Link data includes a unique number (link ID) identifying the link, a link length indicating a length of the link, coordinates of a start and an end of the link, a road name such as the Metropolitan Expressway or the Hanshin Expressway, a road kind such as a toll road or a local road, and a road width.

On the other hand, a node is defined as a point where a road intersects, branches, or converges. Node data includes a node ID assigned to each node, node coordinates, a node name, connecting link IDs of the entire links connecting with the node, and an intersection kind.

Figure 3:
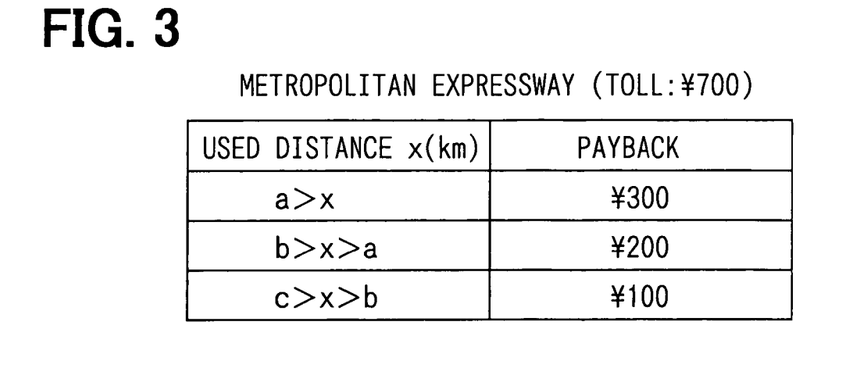
FIG. 3 is a table showing payback amounts based on used distances according to the embodiments.

Toll data of toll roads includes tolls of toll roads such as the Metropolitan Expressway or the Hanshin Expressway. As explained above, some toll roads including the Metropolitan Expressway and the Hanshin Expressway will introduce a partial payback of toll. The payback is executed based on a used distance as shown in a table of a payback amount (in FIG. 3) that is included as the toll data.

The manipulation switch group 110 is constructed of touch switches integrated into a display device 112, mechanical switches, or the like, for use in various input. The display device 112 is constructed of, for instance, a liquid crystal display, for use in displaying on its screen an own-vehicle position mark corresponding to a current position of the subject vehicle inputted from the position detector 101, and a road map surrounding the vehicle generated using the map data inputted from the map data input unit

108. The sound output device 113 is constructed of a speaker, an audio amplifier, or the like, for use in an audio guidance.

The navigation device 100 is inputted with a position of a destination from the remote control sensor 114 via a remote controller 115 or from the manipulation switch group 110. The navigation device 100 thereby automatically retrieves the most appropriate route to the destination from the current position (or a departure point designated by a user) to then generate and display a guiding route as a route guidance function. A method for automatically designating the most appropriate route includes the known Dijkstra Method.

The navigation device 100 is an ETC-associated type to interface with the ETC in-vehicle unit 200, so that, as approaching an ETC gate, the display device 112 is caused to display on its screen guidance leading to the ETC gate. Further, the navigation device 100 obtains information relating to a toll payment history stored in the ETC in-vehicle unit 200, so that the obtained information is displayed on the screen of the display device 112 or is outputted by sound.

The toll payment device 300 of this embodiment is capable of receiving a partial payback of a toll based on a used distance on a toll road that the vehicle uses or travels as a charged distance of the toll road, with respect to the toll road including a loop line and an exit ETC device. That is, the navigation device 100 generates payback information including a used distance of a toll road to thereby send the generated payback information to the center 500 via the ETC in-vehicle unit 200.

Next, a process of the toll payment system will be explained with reference to a communications sequence in FIG. 4. Then, a process of the navigation device 100 will be explained with reference to flow chart diagrams in FIGS. 5 to 7.

Figure 4:
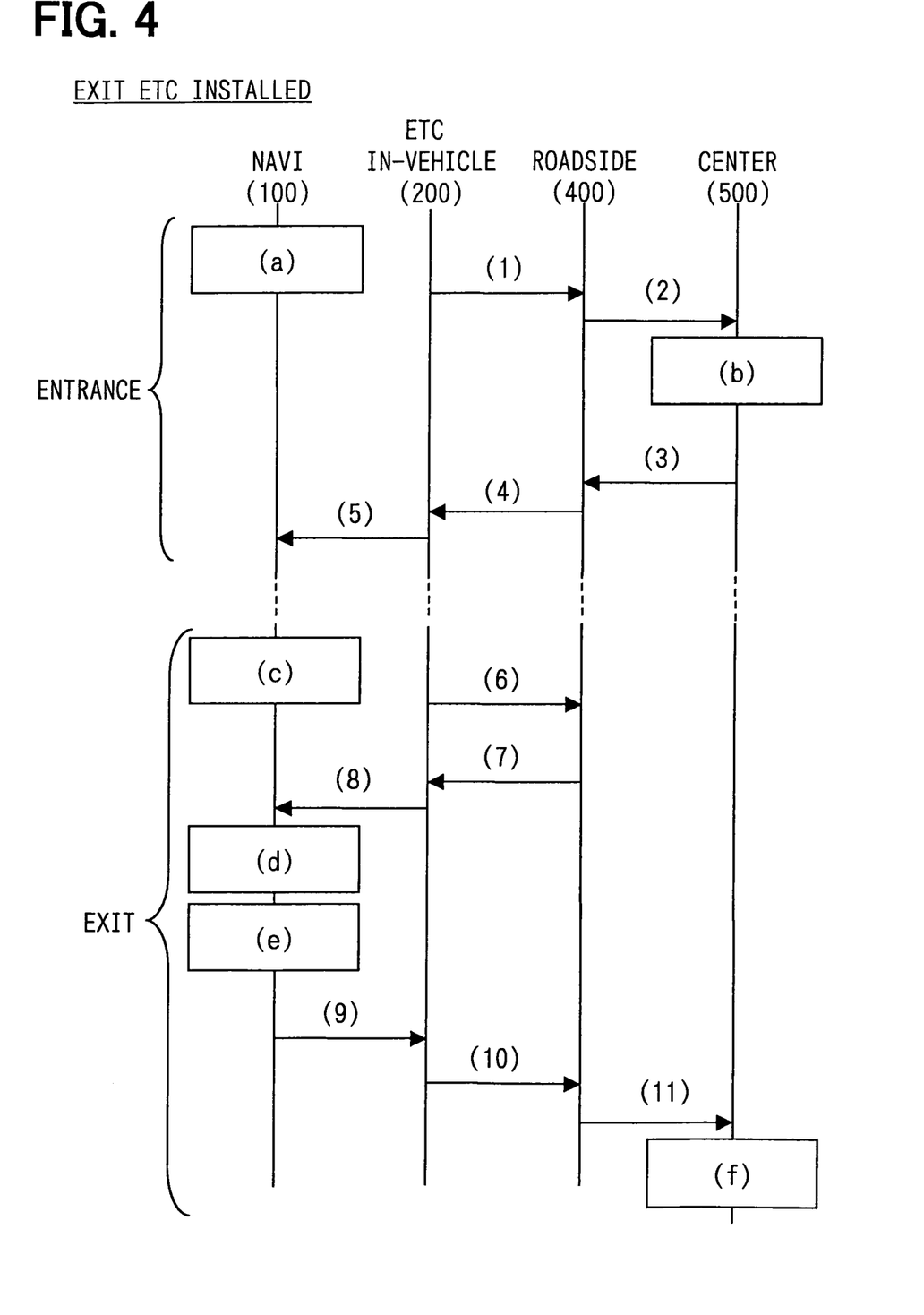
FIG. 4 is a flow chart diagram showing a communications sequence of a toll payment system according to a first embodiment of the present invention.

As a subject vehicle approaches an ETC gate on a toll road to thereby establish a communications link between the ETC in-vehicle unit 200 and the roadside unit 400 of the ETC gate, entrance-passing information is sent from the ETC in-vehicle unit 200 to the roadside unit 400 (1), as shown in FIG. 4. This entrance-passing information includes vehicle information managed by the ETC in-vehicle unit 200, and user ID information necessary for paying a toll. Further, the navigation device 100 also confirms the passing through the ETC gate based on the current position of the subject vehicle and the map data (a).

The roadside unit 400 sends the received entrance-passing information to the center 500 (2); then, the center 500 receives the entrance-passing information to thereby process a toll payment (b). This toll payment process is executed only when the entrance-passing information is received from the roadside unit 400 installed on a toll road such as the Metropolitan Expressway or the Hanshin Expressway adopting a constant-toll payment system. In this toll payment process, a toll is paid from a bank account of a user corresponding to a user ID included in the entrance-passing information.

When receiving the entrance-passing information necessary for the toll payment process, the center 500 sends entrance-passing confirmation information to the roadside unit 400 (3). This entrance-passing confirmation information includes a starting time to use the toll road, a name of the toll road, an interchange being an entrance to the toll road, and the paid toll amount.

When receiving the entrance-passing confirmation information from the center 500, the roadside unit 400 sends the received entrance-passing confirmation information to the ETC in-vehicle unit 200 (4). When receiving the entrance-passing confirmation information, the ETC in-vehicle unit 200 stores it as history information and sends it to the navigation device 100 (5). The navigation device 100 then receives the entrance-passing confirmation information to thereby execute a process of receiving a payback of a partial toll, which will be explained later.

Thereafter, when getting away from the toll road, the vehicle approaches the exit ETC device, to thereby establish a communications link between the ETC in-vehicle unit 200 and the roadside unit 400. Exit-passing information is then sent from the ETC in-vehicle unit 200 to the roadside unit 400 (6). This exit-passing information includes the above entrance-passing information and the above entrance-passing confirmation information. Further, the navigation device 100 also confirms this passing through the ETC gate based on the current position of the subject vehicle and the map data (c).

In a system described in "BACKGROUND OF THE INVENTION," a used distance is differently obtained. That is, a used distance is obtained in the center based a distance along a toll road from an entrance interchange to an exit interchange. Here, the entrance and exit interchange can be obtained, for instance, from passing information using the ETC gates at the entrance and exit of the toll road. When the obtained distance is shorter than a given distance, the partial payback is thereby executed. In this system, when the toll road includes a loop line, an actual used distance may be different from the obtained distance.

By contrast, in this embodiment of the present invention, as shown in FIG. 4, the exit ETC device only confirms passing of the vehicle, while the navigation device 100 computes a used distance of the toll road. First, as the roadside unit 400 receives the exit-passing information, the roadside unit 400 executes a given process based on the received exit-passing information to then send exit-passing confirmation information to the ETC in-vehicle unit 200 (7). This exit-passing confirmation information includes a starting time to use the toll road, the name of the toll road, an interchange being an exit from the toll road for the subject vehicle, and the paid toll amount.

The ETC in-vehicle unit 200 stores the received exit-passing confirmation information as history information and sends it to the navigation device 100 (8). The navigation device 100 receives the exit-passing confirmation information to thereby compute a used distance of the toll road (d), determines whether a payback of a partial toll can be received or not (e). When the payback is determine to be able to be received, the navigation device 100 executes a process of receiving a partial payback, which will be explained later, to then generate payback information.

The generated payback information is sent to the ETC in-vehicle unit 200 (9), then sent from the ETC in-vehicle unit 200 to the roadside unit 400 (10), further, and then sent from the roadside unit 400 to the center 500 (11); finally, the center 500 executes the payback process (f). Here, although the following process is not shown in drawing, the following process takes place. That is, when the payback process is completed in the center 500, payback completion information indicating that the payback is completed is sent from the center 500 to the ETC in-vehicle unit 200 via the roadside unit 400. Further, the payback completion information is sent from the ETC in-vehicle unit 200 to the navigation device 100.

Figure 5:
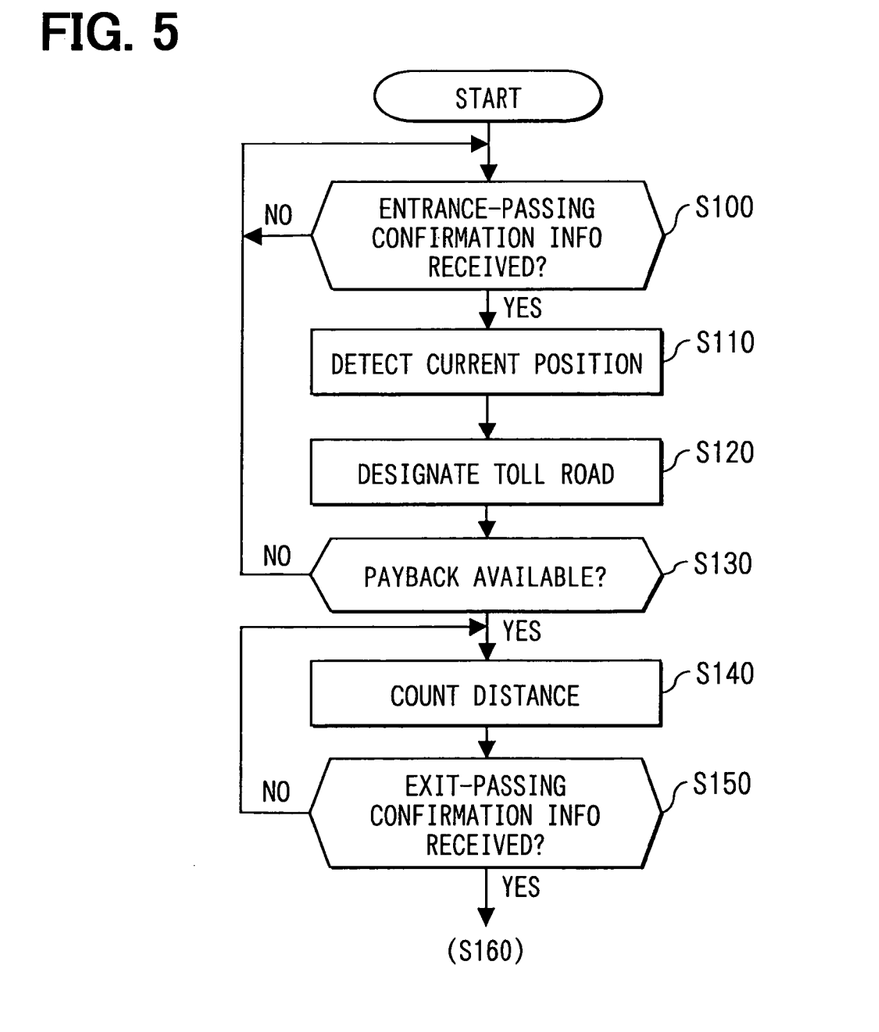
FIG. 5 is a flow chart diagram showing first half of a process of a navigation device according to the first embodiment.

Next, a process in the navigation device 100 for receiving a partial payback will be explained with reference to flow chart diagrams in FIGS. 5 to 7.

At Step S100, it is determined whether or not entrance-passing confirmation information is received from the ETC in-vehicle unit 200. When this determination is affirmed, the process advances to Step S110. By contrast, when this determination is negated, the navigation device 100 enters a waiting state till receiving the entrance-passing confirmation information.

At Step S110, the current position of the subject vehicle is detected. At Step S120, the toll road where the subject vehicle is located is designated. Here, link data corresponding to the current position of the subject vehicle is designated based on the road data constituting the map data in the map data input unit 108. Next, a road kind such as a toll road is designated using a road kind of the link data, while a road name such as the Metropolitan Expressway or the Hanshin Expressway is designated based on a road name of the link data.

At Step S130, it is determined whether the toll road designated at Step S120 belongs to a toll road that a partial payback of a toll is adapted into. When this determination is affirmed, the process advances to Step S140. By contrast, when this determination is negated, the process returns to Step S100 to repeat the above process.

At Step S140, a traveled distance of the subject vehicle starts to be counted. For instance, with reference to a detection result of the distance sensor 104, a traveled distance of the subject vehicle traveling on the toll road continues to be counted until subsequently explained determination at Step S150 is affirmed. At Step S150, it is determined whether the exit-passing confirmation information is received from the ETC in-vehicle unit 200. When this determination is affirmed, the process advances to Step S160. When this determination is negated, the process returns to Step S140 to continue counting the traveled distance.

Figure 6:
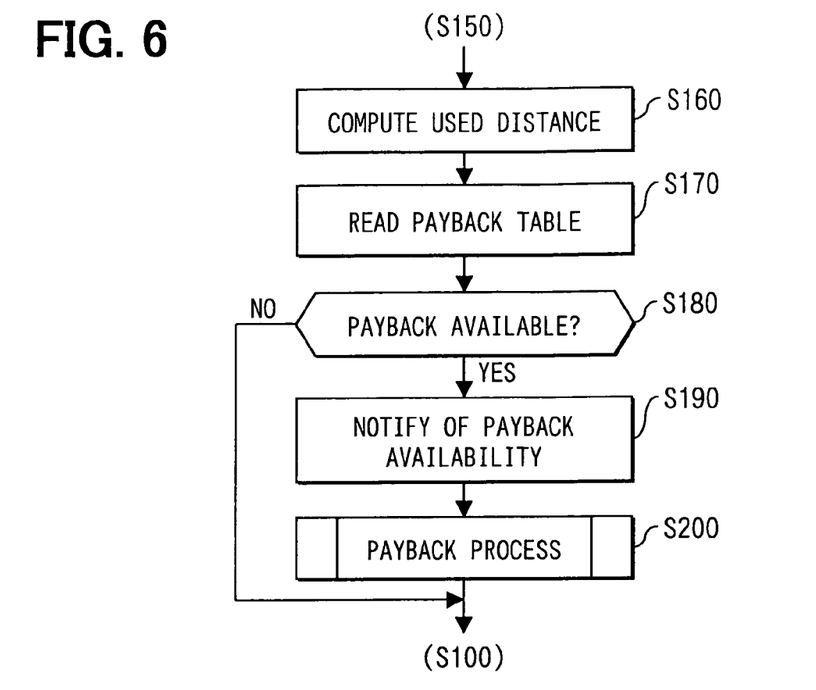
FIG. 6 is a flow chart diagram showing second half of a process of a navigation device according to the first embodiment.
Figure 7:
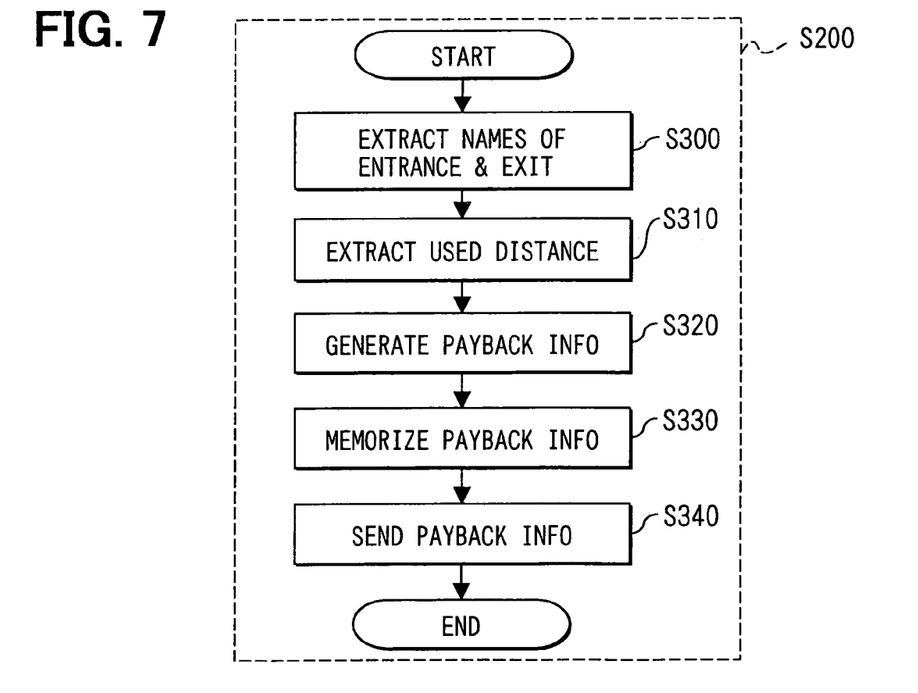
FIG. 7 is a flow chart diagram showing a payback process of a navigation device according to the first embodiment.

At Step 160 in FIG. 6, a used distance for which the subject vehicle uses the toll road is computed. In this embodiment, the used distance is computed with reference to a detection result of the distance sensor 104, so that the computed used distance is a distance for which the subject vehicle actually travels or uses the toll road. Consequently, even when the vehicle circles a loop line in multiple times, the toll-road used distance of the subject vehicle is accurately computed.

Further, a used distance can be also computed differently. That is, first, a traveled track is memorized based on a detection result of the GPS receiver 105. Second, a relevant track from when the entrance-passing confirmation information is received to when the exit-passing confirmation information is extracted from the memorized track, so that a used distance is obtained as a total length of the links included in the extracted relevant track. Consequently, even when the vehicle circles a loop line in multiple times, the toll-road used distance of the subject vehicle is accurately computed.

Further, a used distance can be also obtained as a total length of the links included in a toll road from where the entrance-passing confirmation information is received to where the exit-passing confirmation information is received. In this computation method, the number of cycles of a loop line when a vehicle circles the loop line should be memorized, so that a length of the loop line is multiplied by the number of cycles to obtain an actual traveled distance on the loop line.

At Step S170, a table of payback amounts corresponding to used distances the subject vehicle travels or uses is read out from the toll data of toll roads in the map data input unit 108.

At Step S180, it is determined whether a partial payback is available or not by applying the used distance computed at Step S160 on the table read at Step S170. When the determination is affirmed, the process advances to Step S190. When the determination is negated, the process returns to Step S100 to repeat the above-described process. At Step S190, an effect that the partial payback is available is notified to the user, so that the user can know the effect. At Step S200, a payback process in FIG. 7 is executed. This process enables a payback of a partial toll to be received at the exit of the toll road in this case that a roadside unit 400 as the exit ETC device is installed at the exit of the toll road being the exit point where the subject vehicle ends using the toll road. Here, the payback process at Step S200 is executed when the payback is determined to be available at Step S180; however, without this determination at Step S180 the payback process can be executed just after the process at Step S170.

Next, the payback process at Step S200 will be explained using a flow chart in FIG. 7. At Step S300, names (or interchange names) of the entrance point and the exit point of the toll road are extracted from the entrance-passing confirmation information and exit-passing confirmation information.

At Step S310, the used distance computed at Step S160 is extracted. At Step S320, payback information is generated. This payback information includes route information formed of the interchange names of the entrance point and the exit point extracted at Step S300 and the used distance extracted at Step S310. This thereby generates information necessary for receiving a partial payback based on the toll-road used distance. The route information further includes a start time of using the toll road, a name of the toll road, and a paid toll. Further, the used distance included in the route information indicates a length of the used distance; however, the used distance can be replaced by, for instance, link IDs or node IDs of the links constituting the toll road between the entrance point and the exit point.

At Step S330, the payback information including the route information generated at Step S320 is memorized in the external memory 111 or the like in the navigation device 100. At Step S340, the payback information is sent to the ETC in-vehicle unit 200. The ETC in-vehicle unit 200 then sends the payback information, to which a user ID is assigned, to the roadside unit 400; further, the center 500 interfacing with the ETC in-vehicle unit 200 executes a partial payback process.

As explained above, the toll payment system of this embodiment stores road data including positions of toll roads where a partial payback is available based on a toll-road used distance. Further, the toll-road used distance is computed based on a traveled distance in the navigation device 100. Even when a loop line is circled in multiple times, the toll-road used distance can be thereby accurately computed. Payback information including the used distance is then sent to the center 500, so that a partial payback can be received.

Modification 1

In the toll payment system of the first embodiment, the followings are sent to the center 500 in the payback process: the start time of using the toll road; the name of the toll road; the paid toll; the interchange names of the entrance point and the exit point; and the payback information including the route information having the used distance. However, for instance, when a discount payment system is introduced that discounts a toll based on a use frequency to a user or a commuter who uses the same route on the toll road, use frequency information can be also sent by being attached to the payback information. This use frequency information indicating the frequency of using the same route can be obtained by referring to the payback information stored in the external memory 111.

Thus, a partial payback can be received; further, a discount to the toll can be received based on the use frequency when a discount payment system according to the use frequency of the toll road is introduced. As a result, it is expected that user of the toll road in commuting period is increased.

Modification 2

In the toll payment system of the first embodiment, the followings are sent to the center 500 in the payback process: the start time of using the toll road; the name of the toll road; the paid toll; the interchange names of the entrance point and the exit point; and the payback information including the route information having the used distance. However, for instance, when a payment system is introduced that increases a payback ratio of a toll to a vehicle mounted with an ETC-associated navigation device of this embodiment that is associated with the ETC in-vehicle unit 200, information indicating that the ETC-associated navigation device is being mounted can be also sent by being attached to the payback information.

Thus, in addition to receiving the partial payback, an additional payback can be received when the payment system is introduced that increases a payback ratio of a toll to a vehicle mounted with an ETC-associated navigation device. As a result, it is expected that prevalence of the ETC-associated navigation device can be enhanced.

(Second Embodiment)

A second embodiment is similar in many aspects with the first embodiment, so that the different parts will be mainly explained while the common parts are not explained.

In the toll payment system of the first embodiment, the payback information is sent to the center 500 via the roadside unit 400 that is installed in the ETC gate at the exit point where the subject vehicle ends using of the toll road, so that the partial payback can be received. In contrast, in the second embodiment, the partial payback can be received without the roadside unit 400 that is installed in the ETC gate at the exit point, which is differentiated from the first embodiment.

Figure 8:
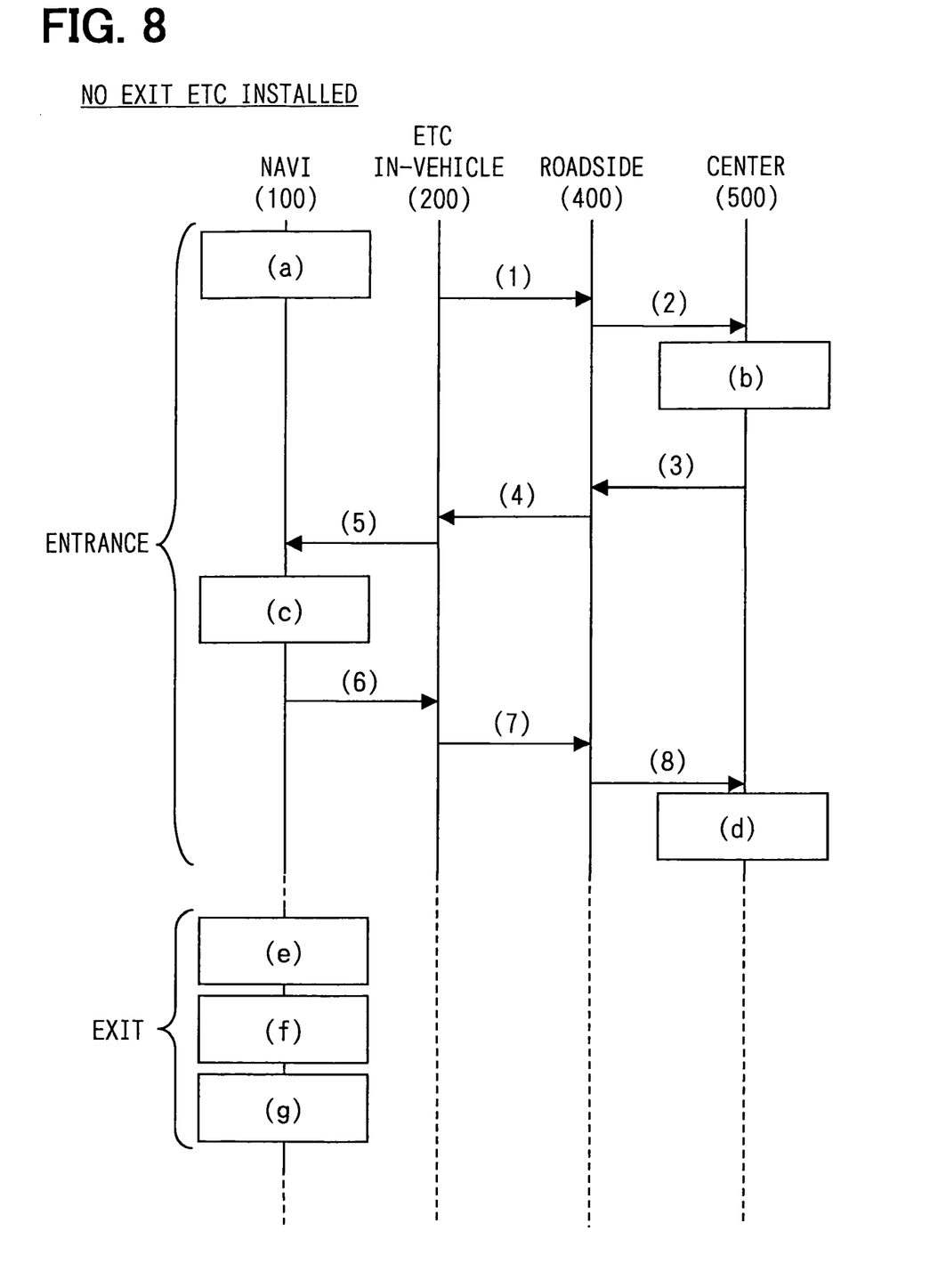
FIG. 8 is a flow chart diagram showing a communications sequence of a toll payment system according to a second embodiment of the present invention.

A communications sequence of the second embodiment is shown in FIG. 8. Here, the entrance-passing confirmation process (a), and the entrance-passing information (1) to (5) are the same as those in FIG. 4 in the first embodiment, so that explanation to them is eliminated.

The navigation device 100 receives the entrance-passing confirmation information from the ETC in-vehicle unit 200. The navigation device 100 then confirms whether a partial payback of the toll paid at the previous toll-road use occasion is reserved, i.e., presence or absence of an outstanding previous payback, while executing the above-described process of receiving a partial payback (c). When the payback is reserved, the navigation device 100 sends the payback information generated when the toll road was previously used to the ETC in-vehicle unit 200 (6), the ETC in-vehicle unit 200 sends the payback information to the roadside unit 400 (7), the roadside unit 400 sends the payback information to the center 500 (8), and the center 500 executes the payback process (d).

Though not shown, when the payback process is finished in the center 500, payback completion information indicating that the payback is completed is sent from the center 500 to the ETC in-vehicle unit 200 via the roadside unit 400, further from the ETC in-vehicle unit 200 to the navigation device 100.

Thereafter, when the subject vehicle gets away from the toll road, the navigation device 100 executes exit-passing confirmation that specifies an exit point where the subject vehicle ends using of the toll road, based on states of the subject vehicle such as a current position, a speed, an angular speed, and an acceleration, and the map data (e).

When specifying the exit point, the navigation device 100 computes a used distance of the toll road from the entrance-passing confirmation information and the specified exit point (f), determines whether a partial payback is available based on the computed used distance (g), and then generates and stores the above-described payback information when the payback is determined to be available. Then, this stored payback information is sent to the center 500 when the subject vehicle uses the toll road at the next toll-road use occasion.

Figure 9:
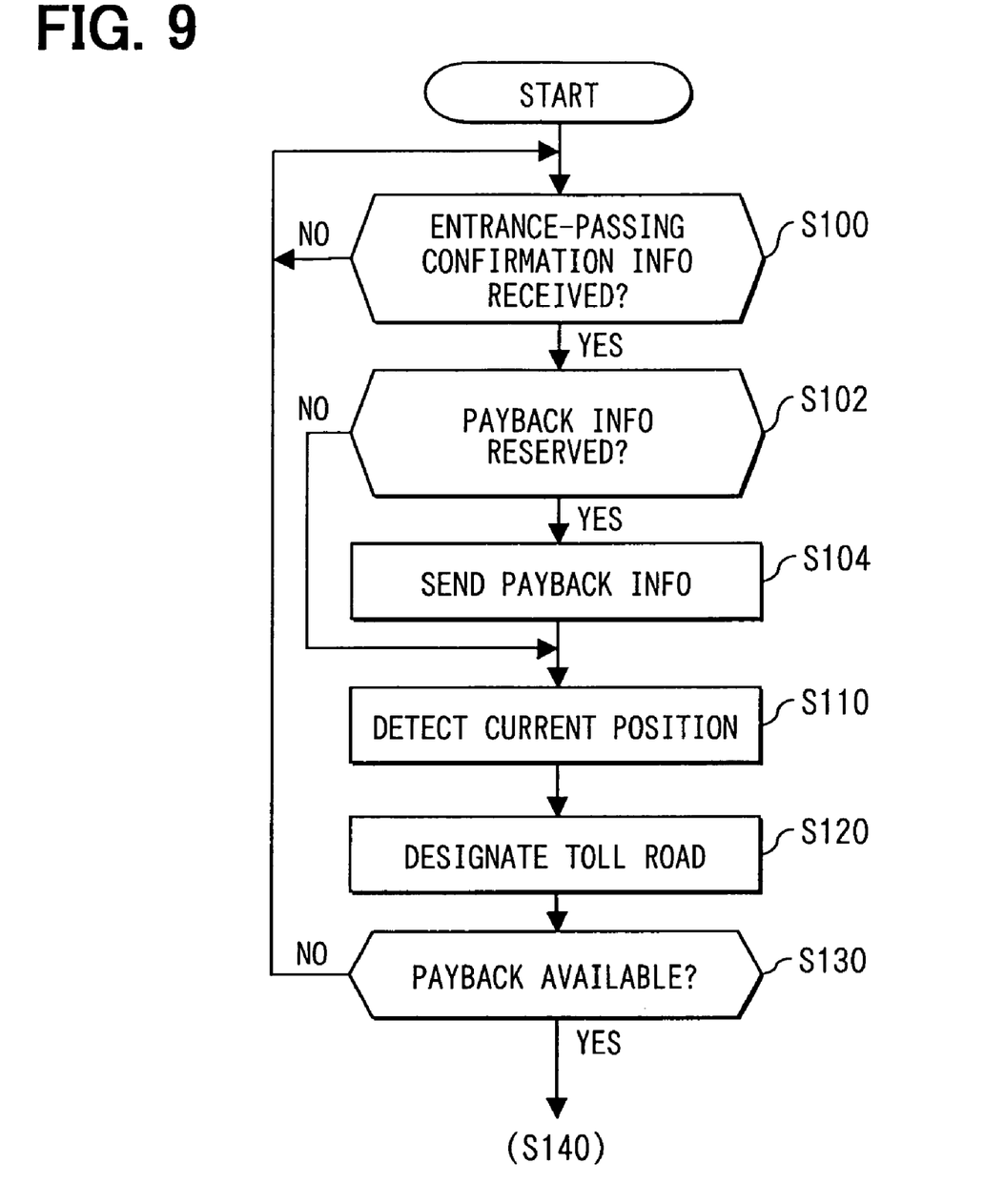
FIG. 9 is a flow chart diagram showing first half of a process of a navigation device according to the second embodiment.
Figure 10:
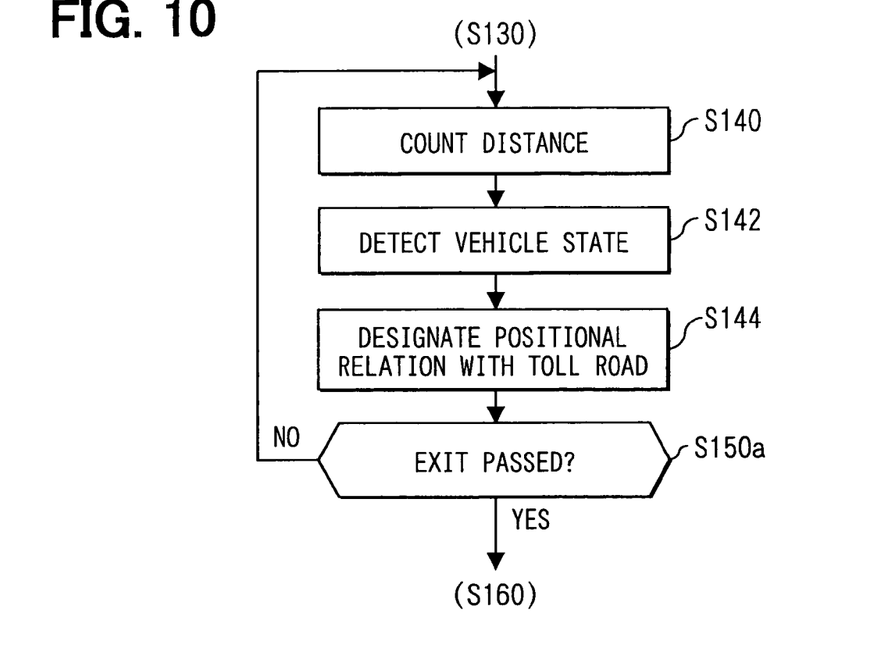
FIG. 10 is a flow chart diagram showing second half of a process of a navigation device according to the second embodiment.
Figure 11:
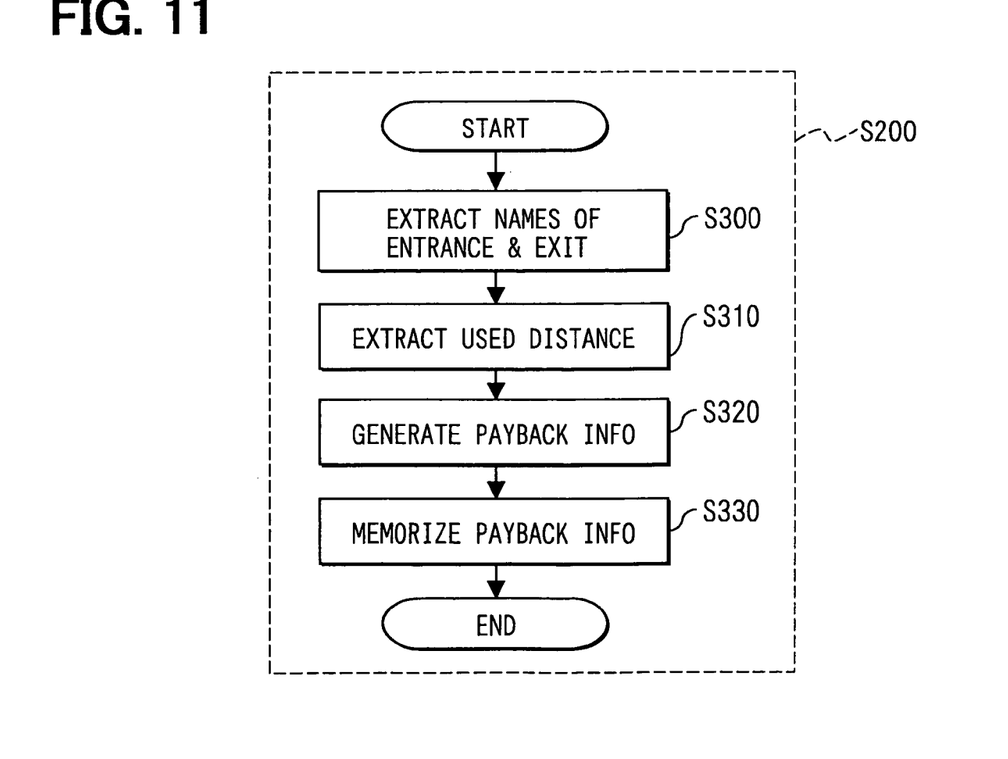
FIG. 11 is a flow chart diagram showing a payback process of a navigation device according to the second embodiment.

Next, a process in the navigation device 100 for receiving a partial payback will be explained with reference to flow chart diagrams in FIGS. 9 to 11.

At Step S100, it is determined whether or not entrance-passing confirmation information is received from the ETC in-vehicle unit 200. When this determination is affirmed, the process advances to Step S102. By contrast, when this determination is negated, the navigation device 100 enters a waiting state till receiving the entrance-passing confirmation information.

At Step S102, it is determined whether payback information reserved at the previous time (or the previous toll-road use occasion) is stored in the external memory 111. When this determination is affirmed, the process advances to Step S104, where the previously reserved payback information is sent to the roadside unit 400 that sent the entrance-passing confirmation information via the ETC in-vehicle unit 200. The payback information is thereby sent to the center 500 from the roadside unit 400, so that the center 500 executes a payback process. By contrast, when this determination is negated, the process directly advances to Step S110.

Thus, even when an exit ETC device or gate is not installed at the exit point where the subject vehicle ends using of the toll road, a partial payback of a toll paid at a certain use occasion on a toll road can be received at the occasion subsequent to the certain occasion on the toll road. Since the payback can be received at the next use, it is expected that opportunity of re-use of the toll road increases to thereby result in increase in the use of the toll road.

At Step S110, the current position of the subject vehicle is detected. At Step S120, the toll road where the subject vehicle is located is designated. Here, link data corresponding to the current position of the subject vehicle is designated based on the road data constituting the map data in the map data input unit 108. Next, a road kind such as a toll road is designated using a road kind of the link data, while a road name such as the Metropolitan Expressway or the Hanshin Expressway is designated based on a road name of the link data.

At Step S130, it is determined whether the toll road designated at Step S120 belongs to a toll road in which a partial payback of a toll is available. When this determination is affirmed, the process advances to Step S140. By contrast, when this determination is negated, the process returns to Step S100 to repeat the above process.

At Step S140, a traveled distance of the subject vehicle starts to be counted. For instance, with reference to a detection result of the distance sensor 104, a traveled distance of the subject vehicle traveling on the toll road continues to be counted until subsequently explained determination at Step S150a is affirmed.

At Step S142, vehicle states of the subject vehicle such as a speed, an angular speed, or an acceleration are detected. At Step S144, a positional relationship with the toll road is designated based on the current position of the subject vehicle and the map data.

At Step S150a, it is determined whether the subject vehicle passes through an exit point where the subject vehicle ends using of the toll road based on the vehicle states detected at Step S142 and the positional relationship with the toll road designated at Step S144. For instance, a road constituting an entrance or an exit of the Metropolitan Expressway or the like is apt to include a point where an inclination or curvature rapidly varies. Therefore, detecting changes in the vehicle states such as the speed, the angular speed, and the acceleration, due to the changes in the inclination or the curvature, enables designation of an exit point where the subject vehicle ends using of the toll road. Thus, without installing an exit ETC device, the exit point of the toll road can be designated. When the determination at Step S150a is affirmed, the process advances to Step S160. When the determination at Step S150a is negated, the process returns to Step S140, where the traveled distance continues to be counted.

Here, the process at Steps S160 to S200 is the same as that in the first embodiment, so that explanation is eliminated. Further, at Step S190, the effect that the partial payback is available at a subsequent occasion (i.e., at next opportunity of using the toll road) is notified to the user, so that the user can know the effect. Furthermore, the payback process at Step S200 can be executed without this determination at Step S180 just after the process at Step S170.

Next, the payback process at Step S200 will be explained using a flow chart in FIG. 11. At Step S300, a name (or interchange name) of the entrance point of the toll road is extracted from the entrance-passing confirmation information, while a name (or interchange name) of the exit point of the toll road is extracted based on the map data.

At Step S310, the used distance computed at Step S160 is extracted. At Step S320, payback information is generated. This payback information includes the interchange names of the entrance point and the exit point extracted at Step S300 and the used distance extracted at Step S310, a start time of using the toll road, the name of the toll road, and a paid toll. At Step S330, the payback information including route information generated at Step S320 is stored in the external memory 111 in the navigation device 100. Thereafter, at the timing of the next use of the toll road, this stored payback information is sent to the center 500, so that the partial payback can be received.

As explained above, in the toll payment system of the second embodiment, when an exit ETC device is not installed, a partial payback of a toll paid at the previous time can be received at the timing when the subject vehicle passes through the ETC gate in the next time to then pay the toll. Since the payback can be received at the next use, it is expected that opportunity of re-use of the toll road increases to thereby result in increase in the use of the toll road.

It will be obvious to those skilled in the art that various changes may be made in the above-described embodiments of the present invention. However, the scope of the present invention should be determined by the following claims.

What is claimed is:

1. A toll payment device that is provided in a vehicle for paying a toll at an electronic toll collection gate that the vehicle passes when using a toll road, and is able to receive a partial payback of the paid toll based on a used distance that is used on the toll road, the toll payment device comprising:
    an in-vehicle unit that automatically pays a toll by communications with a roadside unit disposed at the electronic toll collection gate;
    a road data storing unit that stores road data including position information of the toll road;
    a position detector that detects a current position of the vehicle;
    a used-distance information generating unit that generates used-distance information relating to a used distance of the toll road that the vehicle uses, based on the detected current position and the stored road data;
    a transmitting unit that transmits the generated used-distance information;
    a vehicle-state detecting unit that detects a vehicle state of at least one of a speed, an angular speed, and an acceleration; and
    an entrance and exit designating unit that designates an entrance and an exit where the vehicle starts and ends a use of the toll road, respectively, based on at least one of the detected vehicle state and passing-confirmation information that is outwardly transmitted by the in-vehicle unit when the vehicle passes an electronic toll collection gate,
    wherein the used-distance information generating unit generates the used-distance information relating to a used distance used from the designated entrance to the designated exit, and
    wherein, in a case where the in-vehicle unit outwardly does not transmit passing-confirmation information relating to passing an electronic toll collection gate corresponding to an exit of the toll road at a certain toll-road use occasion, the transmitting unit transmits used-distance information relating to a used distance of the toll road that the vehicle uses at the certain toll-road use occasion when a toll is paid by using the in-vehicle unit at a toll-road use occasion subsequent to the certain toll-road use occasion.

2. The toll payment device of claim 1,
    wherein the road data storing unit, the position detector, the used-distance information generating unit, and the transmitting unit are included in a navigation device.

3. The toll payment device of claim 1,
    wherein the road data storing unit stores the road data including a position and a length of each of a plurality of links included in the toll road,
    wherein the used-distance information generating unit generates used-distance information relating to a total length of links included from the designated entrance to the designated exit.

4. The toll payment device of claim 1, further comprising:
    a traveled-distance detecting unit that detects a traveled distance of the vehicle,
    wherein the used-distance information generating unit generates used-distance information relating to a traveled distance detected from the designated entrance to the designated exit.

5. The toll payment device of claim 1, further comprising:
a traveled-track storing unit that stores a traveled track of the vehicle based on the a detection result by the position detector,
wherein the road data storing unit stores the road data including a position and a length of each of a plurality of links included in the toll road, and
wherein the used-distance information generating unit generates used-distance information based on an entire traveled track included in the stored traveled track from the designated entrance to the designated exit and road data corresponding to the entire traveled track included in the stored traveled track from the designated entrance to the designated exit.

6. The toll payment device of claim 1, further comprising:
a determining unit that determines whether a part of the toll is paid back based on the generated used-distance information; and
a notifying unit that notifies of an effect based on a determination result by the determining unit,
wherein, in a case where the in-vehicle unit outwardly does not transmit passing-confirmation information relating to passing an electronic toll collection gate corresponding to an exit of the toll road at a certain toll-road use occasion though a part of the toll is determined to be paid back, the notifying unit notifies an effect that a payback should be received at a toll-road use occasion subsequent to the certain toll-road use occasion.

7. The toll payment device of claim 1,
wherein the transmitting unit transmits to a roadside unit disposed at the electronic toll collection gate via the in-vehicle unit route information including the generated used-distance information, the designated entrance, and the designated exit.

8. The toll payment device of claim 7, further comprising:
a use-frequency storing unit that stores use-frequency information relating to a use frequency with which the vehicle uses the toll road,
wherein the transmitting unit transmits the use-frequency information in addition to the route information.

9. The toll payment device of claim 7,
wherein the road data storing unit, the position detector, the used-distance information generating unit, and the transmitting unit are included in an associated navigation device that is associated with a function included in the in-vehicle unit, and
wherein the transmitting unit transmits information indicating that the associated navigation device is present, in addition to the route information.

10. A toll payment system for a vehicle executing, at an electronic toll collection gate that the vehicle passes when using a toll road, a toll payment for paying a toll for the toll road where a payback of a part of the paid toll is able to be received based on a used distance that is used on the toll road, the toll payment system comprising:
a toll payment device that is provided in the vehicle and includes
an in-vehicle unit that automatically pays a toll by communications with a roadside unit disposed at the electronic toll collection gate and outwardly transmits passing-confirmation information when the vehicle passes an electronic toll collection gate,
a road data storing unit that stores road data including position information of the toll road,
a position detector that detects a current position of the vehicle,
a vehicle-state detecting unit that detects a vehicle state of at least one of a speed, an angular speed, and an acceleration,
an entrance and exit designating unit that designates an entrance and an exit where the vehicle starts and ends a use of the toll road, respectively, based on at least one of the detected vehicle state and the passing-confirmation information that is outwardly transmitted by the in-vehicle unit,
a used-distance information generating unit that generates used-distance information relating to a used distance of the toll road that the vehicle uses from the designated entrance to the designated exit, based on the detected current position and the stored road data, and
a transmitting unit that transmits the generated used-distance information; and
a center that includes a processing unit that interfaces with the roadside unit and executes via the roadside unit a process relating to the payback when the used-distance information is received via the roadside unit in addition to a process relating to the toll payment
wherein, in a case where the in-vehicle unit outwardly does not transmit passing confirmation information relating to passing an electronic toll collection gate corresponding to an exit of the toll road at a certain toll-road use occasion, the transmitting unit transmits used-distance information relating to a used distance of the toll road that the vehicle uses at the certain toll-road use occasion when a toll is paid by using the in-vehicle unit at a toll-road use occasion subsequent to the certain toll-road use occasion.

11. A toll payment system of claim 10,
wherein the transmitting unit transmits to a roadside unit disposed at the electronic toll collection gate via the in-vehicle unit route information including the generated used-distance information, the designated entrance, and the designated exit.

12. A toll payment system of claim 11,
wherein the toll payment device further includes a use-frequency storing unit that stores use-frequency information relating to a use frequency with which the vehicle uses the toll road,
wherein the transmitting unit transmits the use-frequency information in addition to the route information, and
wherein, when the processing unit included in the center receives the use-frequency information via the roadside unit and a use frequency indicated by the received use-frequency information is a given frequency or more, the processing unit executes a discount from the toll.

13. A toll payment system of claim 11,
wherein the road data storing unit, the position detector, the used-distance information generating unit, and the transmitting unit are included in an associated navigation device that is associated with a function included in the in-vehicle unit,
wherein the transmitting unit transmits certain information indicating that the associated navigation device is present, in addition to the route information, and
wherein, when the processing unit included in the center received the certain information, the processing unit increases payback.

14. A toll payment device that is provided in a vehicle for paying a toll at an electronic toll collection gate that the vehicle passes when using a toll road, and is able to receive a partial payback of the paid toll based on a used distance that is used on the toll road, the toll payment device comprising:

an in-vehicle unit that automatically pays a toll by communications with a roadside unit disposed at the electronic toll collection gate;

a road data storing unit that stores road data including position information of the toll road;

a position detector that detects a current position of the vehicle;

a used-distance information generating unit that generates used-distance information relating to a used distance of the toll road that the vehicle uses, based on the detected current position and the stored road data;

a transmitting unit that transmits the generated used-distance information;

a vehicle-state detecting unit that detects a vehicle state of at least one of a speed, an angular speed, and an acceleration;

an entrance and exit designating unit that designates an entrance and an exit where the vehicle starts and ends a use of the toll road, respectively, based on at least one of the detected vehicle state and passing-confirmation information that is outwardly transmitted by the in-vehicle unit when the vehicle passes an electronic toll collection gate; and a use-frequency storing unit that stores use-frequency information relating to a use frequency with which the vehicle uses the toll road, wherein the used-distance information generating unit generates the used-distance information relating to a used distance used from the designated entrance to the designated exit, wherein the transmitting unit transmits to a roadside unit disposed at the electronic toll collection gate via the in-vehicle unit route information including the generated used-distance information, the designated entrance, and the designated exit, and wherein the transmitting unit transmits the use-frequency information in addition to the route information.

15. A toll payment device that is provided in a vehicle for paying a toll at an electronic toll collection gate that the vehicle passes when using a toll road, and is able to receive a partial payback of the paid toll based on a used distance that is used on the toll road, the toll payment device comprising:

an in-vehicle unit that automatically pays a toll by communications with a roadside unit disposed at the electronic toll collection gate;

a road data storing unit that stores road data including position information of the toll road;

a position detector that detects a current position of the vehicle;

a used-distance information generating unit that generates used-distance information relating to a used distance of the toll road that the vehicle uses, based on the detected current position and the stored road data;

a transmitting unit that transmits the generated used-distance information;

a vehicle-state detecting unit that detects a vehicle state of at least one of a speed, an angular speed, and an acceleration; and an entrance and exit designating unit that designates an entrance and an exit where the vehicle starts and ends a use of the toll road, respectively, based on at least one of the detected vehicle state and passing-confirmation information that is outwardly transmitted by the in-vehicle unit when the vehicle passes an electronic toll collection gate, wherein the used-distance information generating unit generates the used-distance information relating to a used distance used from the designated entrance to the designated exit, wherein the transmitting unit transmits to a roadside unit disposed at the electronic toll collection gate via the in-vehicle unit route information including the generated used-distance information, the designated entrance, and the designated exit, wherein the road data storing unit, the position detector, the used-distance information generating unit, and the transmitting unit are included in an associated navigation device that is associated with a function included in the in-vehicle unit, and wherein the transmitting unit transmits information indicating that the associated navigation device is present, in addition to the route information.

16. A toll payment system for a vehicle executing, at an electronic toll collection gate that the vehicle passes when using a toll road, a toll payment for paying a toll for the toll road where a payback of a part of the paid toll is able to be received based on a used distance that is used on the toll road, the toll payment system comprising:

a toll payment device that is provided in the vehicle and includes an in-vehicle unit that automatically pays a toll by communications with a roadside unit disposed at the electronic toll collection gate and outwardly transmits passing-confirmation information when the vehicle passes an electronic toll collection gate, a road data storing unit that stores road data including position information of the toll road, a position detector that detects a current position of the vehicle, a vehicle-state detecting unit that detects a vehicle state of at least one of a speed, an angular speed, and an acceleration, an entrance and exit designating unit that designates an entrance and an exit where the vehicle starts and ends a use of the toll road, respectively, based on at least one of the detected vehicle state and the passing-confirmation information that is outwardly transmitted by the in-vehicle unit, a used-distance information generating unit that generates used-distance information relating to a used distance of the toll road that the vehicle uses from the designated entrance to the designated exit, based on the detected current position and the stored road data, and a transmitting unit that transmits the generated used-distance information; and a center that includes a processing unit that interfaces with the roadside unit and executes via the roadside unit a process relating to the payback when the used-distance information is received via the roadside unit in addition to a process relating to the toll payment, wherein the transmitting unit transmits to a roadside unit disposed at the electronic toll collection gate via the in-vehicle unit route information including the generated used-distance information, the designated entrance, and the designated exit, wherein the toll payment device further includes a use-frequency storing unit that stores use-frequency information relating to a use frequency with which the vehicle uses the toll road, wherein the transmitting unit transmits the use-frequency information in addition to the route information, and wherein, when the processing unit included in the center receives the use-frequency information via the roadside unit and a use frequency indicated by the received use-frequency information is a given frequency or more, the processing unit executes a discount from the toll.

17. A toll payment system for a vehicle executing, at an electronic toll collection gate that the vehicle passes when using a toll road, a toll payment for paying a toll for the toll road where a payback of a part of the paid toll is able to be received based on a used distance that is used on the toll road, the toll payment system comprising:

a toll payment device that is provided in the vehicle and includes
- an in-vehicle unit that automatically pays a toll by communications with a roadside unit disposed at the electronic toll collection gate and outwardly transmits passing-confirmation information when the vehicle passes an electronic toll collection gate,
- a road data storing unit that stores road data including position information of the toll road,
- a position detector that detects a current position of the vehicle,
- a vehicle-state detecting unit that detects a vehicle state of at least one of a speed, an angular speed, and an acceleration,
- an entrance and exit designating unit that designates an entrance and an exit where the vehicle starts and ends a use of the toll road, respectively, based on at least one of the detected vehicle state and the passing-confirmation information that is outwardly transmitted by the in-vehicle unit,
- a used-distance information generating unit that generates used-distance information relating to a used distance of the toll road that the vehicle uses from the designated entrance to the designated exit, based on the detected current position and the stored road data, and
- a transmitting unit that transmits the generated used-distance information; and a center that includes a processing unit that interfaces with the roadside unit and executes via the roadside unit a process relating to the payback when the used-distance information is received via the roadside unit in addition to a process relating to the toll payment, wherein the transmitting unit transmits to a roadside unit disposed at the electronic toll collection gate via the in-vehicle unit route information including the generated used-distance information, the designated entrance, and the designated exit wherein the road data storing unit, the position detector, the used-distance information generating unit, and the transmitting unit are included in an associated navigation device that is associated with a function included in the in-vehicle unit, wherein the transmitting unit transmits certain information indicating that the associated navigation device is present, in addition to the route information, and wherein, when the processing unit included in the center received the certain information, the processing unit increases payback.

* * * * *